(12) United States Patent
Jensen

(10) Patent No.: US 8,454,318 B2
(45) Date of Patent: Jun. 4, 2013

(54) REINFORCED AERODYNAMIC PROFILE

(75) Inventor: Find Mølholt Jensen, Sjælland (DK)

(73) Assignee: Bladena ApS, Ringsted (DK)

( * ) Notice: Subject to any disclaimer, the term of this patent is extended or adjusted under 35 U.S.C. 154(b) by 799 days.

(21) Appl. No.: 12/448,253

(22) PCT Filed: Dec. 14, 2007

(86) PCT No.: PCT/DK2007/000547
§ 371 (c)(1),
(2), (4) Date: Sep. 14, 2009

(87) PCT Pub. No.: WO2008/071195
PCT Pub. Date: Jun. 19, 2008

(65) Prior Publication Data
US 2010/0014979 A1    Jan. 21, 2010

(30) Foreign Application Priority Data
Dec. 15, 2006    (DK) .................................. 2006 01651

(51) Int. Cl.
*B64C 11/24*    (2006.01)
*F01D 5/16*    (2006.01)

(52) U.S. Cl.
USPC .......................................... 416/226; 416/233

(58) Field of Classification Search
USPC .............................. 416/223 R, 232, 233, 226
See application file for complete search history.

(56) References Cited

U.S. PATENT DOCUMENTS

| | | | |
|---|---|---|---|
| 3,323,597 A * | 6/1967 | Lougobardi et al. | 416/144 |
| 3,333,642 A * | 8/1967 | Kee | 416/226 |
| 3,967,996 A * | 7/1976 | Kamov et al. | 156/156 |
| 4,295,790 A * | 10/1981 | Eggert, Jr. | 416/226 |
| 4,305,699 A | 12/1981 | Martinelli | |
| 4,494,910 A | 1/1985 | Hahn et al. | |
| 4,643,646 A | 2/1987 | Hahn et al. | |
| 4,976,587 A | 12/1990 | Johnston et al. | |
| 5,375,324 A | 12/1994 | Wallace et al. | |
| 5,401,138 A * | 3/1995 | Mosiewicz | 416/226 |
| 5,534,354 A | 7/1996 | Gregg et al. | |

(Continued)

FOREIGN PATENT DOCUMENTS

| | | |
|---|---|---|
| CA | 1151072 | 7/1981 |
| CN | 101029629 A | 9/2007 |

(Continued)

OTHER PUBLICATIONS

Jensen, et al.; Full Scale Test of a SSP 34m box gridder 1.Data Report; Riso National Laboratory for Sustainable Energy; Mar. 2008; pp. 1-77; Riso-R-1622 (EN); Technical University of Denmark; Roskilde, Denmark.

(Continued)

*Primary Examiner* — Edward Look
*Assistant Examiner* — William Grigos
(74) *Attorney, Agent, or Firm* — Lee & Morse, P.C.

(57) ABSTRACT

The present invention relates to the prevention of deformations in an aerodynamic profile caused by lack of resistance to the bending moment forces that are created when such a profile is loaded in operation. More specifically, the invention relates to a reinforcing element inside an aerodynamic profile and a method for the construction thereof. The profile is intended for, but not limited to, use as a wind turbine blade, an aerofoil device or as a wing profile used in the aeronautical industry.

29 Claims, 22 Drawing Sheets

U.S. PATENT DOCUMENTS

| | | | |
|---|---|---|---|
| 6,457,943 | B1 | 10/2002 | Olsen et al. |
| 7,179,059 | B2 | 2/2007 | Sorensen et al. |
| 7,198,471 | B2 | 4/2007 | Gunneskov et al. |
| 7,901,188 | B2 | 3/2011 | Llorente Gonzalez et al. |
| 2003/0116262 | A1 | 6/2003 | Stiesdal et al. |
| 2006/0175731 | A1 | 8/2006 | Bech et al. |
| 2007/0040294 | A1 | 2/2007 | Arelt |
| 2007/0110584 | A1* | 5/2007 | Stommel ................ 416/233 |
| 2007/0110585 | A1 | 5/2007 | Bonnet |
| 2007/0140861 | A1 | 6/2007 | Wobben |
| 2007/0189903 | A1 | 8/2007 | Eyb |
| 2007/0217918 | A1 | 9/2007 | Baker et al. |
| 2008/0069699 | A1 | 3/2008 | Bech |
| 2008/0304971 | A1 | 12/2008 | Liebmann |
| 2008/0310964 | A1 | 12/2008 | Llorente Gonzalez et al. |
| 2009/0208341 | A1 | 8/2009 | Llorente Gonzalez et al. |
| 2009/0324412 | A1 | 12/2009 | Roorda |
| 2010/0062238 | A1 | 3/2010 | Doyle et al. |
| 2010/0092300 | A1 | 4/2010 | Jensen et al. |

FOREIGN PATENT DOCUMENTS

| | | | |
|---|---|---|---|
| DE | 2923463 | A1 | 12/1980 |
| DE | 3037677 | A1 | 5/1982 |
| DE | 4225599 | A1 | 2/1994 |
| DE | 4428730 | A1 | 2/1996 |
| DE | 20320714 | U1 | 2/2005 |
| EP | 0061567 | A2 | 2/1982 |
| EP | 0062737 | A1 | 2/1982 |
| EP | 0258926 | A1 | 3/1988 |
| EP | 0391702 | A1 | 10/1990 |
| EP | 1184566 | A1 | 3/2002 |
| EP | 1310351 | A1 | 5/2003 |
| EP | 1522724 | A1 | 4/2005 |
| EP | 1584817 | A1 | 10/2005 |
| EP | 1754589 | A1 | 2/2007 |
| EP | 1785621 | A2 | 5/2007 |
| EP | 1808598 | A1 | 7/2007 |
| EP | 1878915 | A2 | 1/2008 |
| EP | 1880833 | A1 | 1/2008 |
| FR | 568874 | A | 4/1924 |
| FR | 701140 | A | 3/1931 |
| FR | 703261 | A | 4/1931 |
| FR | 2286953 | A1 | 4/1976 |
| FR | 2459381 | A1 | 1/1981 |
| FR | 2898865 | A1 | 9/2007 |
| GB | 319299 | | 9/1929 |
| GB | 909004 | | 10/1962 |
| GB | 2042093 | A | 9/1980 |
| GB | 2062120 | A | 5/1981 |
| GB | 2115075 | A | 9/1983 |
| JP | 61-192866 | A | 8/1986 |
| JP | 62-282176 | A | 12/1987 |
| JP | 62282176 | A * | 12/1987 |
| JP | 2003-214322 | A | 7/2003 |
| JP | 2003-293937 | A | 10/2003 |
| JP | 2003293937 | A * | 10/2003 |
| NL | 9100816 | A | 12/1992 |
| WO | WO 00/14405 | | 3/2000 |
| WO | WO 01/46582 | A2 | 6/2001 |
| WO | WO 01/46582 | A3 | 6/2001 |
| WO | WO 01/98653 | A1 | 12/2001 |
| WO | WO 03/008800 | A1 | 1/2003 |
| WO | WO 03/087572 | A1 | 10/2003 |
| WO | WO 2004/078442 | A1 | 9/2004 |
| WO | WO 2005/011964 | A1 | 2/2005 |
| WO | WO 2006/002621 | A1 | 1/2006 |
| WO | WO 2006/066593 | A1 | 6/2006 |
| WO | WO 2006/103307 | A2 | 10/2006 |
| WO | WO 2008/086805 | A1 | 7/2008 |
| WO | WO 2008/089765 | A2 | 7/2008 |
| WO | WO 2008/089765 | A3 | 7/2008 |

OTHER PUBLICATIONS

Jensen; Ultimate strength of a large wind turbine blade; Riso National Laboratory for Sustainable Energy; May 2008; pp. 1-313; Riso-PhD-34(EN); ISBN 978-87-550-3634-5, DTU BYG R-205-ISBN=9788778772831; Technical University of Denmark; Roskilde & Kgs. Lyngby, Denmark.

Jensen, et al.; Full Scale Test of a SSP 34m box girder 1.Data Report; Appendix E; Riso National Laboratory for Sustainable Energy; Mar. 2008; pp. 78-150; Riso-R-1622 (EN); Technical University of Denmark; Roskilde, Denmark.

Jensen, et al.; Full Scale Test of a SSP 34m box girder 2. Data Report; Riso National Laboratory for Sustainable Energy; May 2008; pp. 1-159; Riso-R-1588 (EN); Technical University of Denmark; Roskilde, Denmark.

PCT International Search Report in DK 2008/00861, dated Feb. 20, 2009 (Jensen).

PCT International Search Report in DK 2008/00867, dated Feb. 24, 2009 (Jensen).

PCT International Search Report in 2008/0921, dated Mar. 24, 2009 (Jensen).

Notification of Transmittal of InternationalSearch Report, International Search Report and Written Opinion if the International Searching Authority in PCT/DK2009/000150 dated Sep. 9, 2009 (Jensen).

Nielsen; Experimental and numerical analysis of a wind turbine blade cross section under lateral load conditions; pp. 1-44; Dec. 20, 2006.

Jensen, et al.; Structural testing and numerical simulation of a 34 m composite wind turbine blade; Composite Structures; Jul. 2006; pp. 52-61; vol. 76; Elsevier.

Technical Survey Report 162778; PRV InterPat; Dec. 27, 2007; pp. 1-3; Stockholm, Sweden.

Technical Survey Report; 162779; PRV InterPat; Dec. 27, 2007; pp. 1-4; Stockholm, Sweden.

Technical Survey Report; 162780; PRV InterPat; Dec. 27, 2007; pp. 1-4 Stockholm, Sweden.

Chinese Office action dated Jan. 7, 2013 for related application CN 200980124196.2.

* cited by examiner

REINFORCED AERODYNAMIC PROFILE

CROSS REFERENCE TO RELATED APPLICATIONS

This is the U.S. national phase application based on PCT application No. PCT/DK2007/000547 filed Dec. 14, 2007, which is based on Danish Application PA 2006 01651, filed Dec. 15, 2006, the entire contents of all of which is hereby incorporated by reference.

The present invention relates to the prevention of deformations in an aerodynamic profile caused by lack of resistance to the bending moment forces that are created when such a profile is loaded in operation. More specifically, the invention relates to a reinforcing element inside an aerodynamic profile and a method for the construction thereof. The profile is intended for, but not limited to, use as a wind turbine blade, an aerofoil device or as a wing profile used in the aeronautical industry.

The invention described in this application takes as its starting point blades or wings for wind turbines, but it should be understood that the invention is not in any way intended as being limited to aerodynamic profiles for this particular purpose, as the invention may be equally relevant to any other type of aerodynamic profile or use thereof.

A wind turbine blade normally consists of an aerodynamic shell and an internal girder such as a beam or a spar, the girder can be a single beam, but often two girders are used, and along with the shell the girders can be said to form a box profile. The top and bottom of the box profile are often referred to as the caps. The caps typically follow the aerodynamic shape (or curvature) of the profile, and therefore themselves have a transverse curvature. The aerodynamic shell is typically a laminate of fibreglass and/or other materials.

The section(s) of the aerodynamic shell where the internal girders are placed is/are usually reinforced in some way and is/are consequently often quite thick. The other part(s) or section(s) of the aerodynamic shell is typically only a thin skin or a laminate such as a sandwich construction with thin skins and a core material. A blade is typically provided by gluing or bonding or otherwise connecting parts to each other.

In operation, the blade is primarily loaded in the flapwise direction by aerodynamic and inertia forces. By flapwise direction is meant a direction substantially perpendicular to a transverse axis through a cross-section of the broad side of the blade. Alternatively, the flapwise direction may be construed as the direction (or the opposite direction) in which the aerodynamic lift acts on the profile. The flapwise direction is illustrated by way of example as indicated by arrow A in FIG. 1a. The forces induce a bending moment on the blade and this in turn causes an ovalization, or flattening, (FIGS. 1a and 1b) of the box profile and can also lead to buckling failure of the blade. When the blade is loaded in the flapwise direction, the material in one of the caps is loaded in compression. When this compression load is exceeding a certain limit, which is dependent on the thickness, the curvature, the materials and the orientation of the materials of the cap, the cap is pushed out of its original shape, and a buckling pattern is forming. If the flapwise load, and thereby the compression load increases further, the blade may suddenly collapse.

In the currently available blades, the caps are typically heavily reinforced to provide the necessary moment of inertia to take up the load from the bending moment. Failure of a blade is determined by several individual factors. However, one very important factor is the resistance of the caps against buckling. If or when buckling occurs, the curvature of the profile's cross-section may e.g. transform as shown in FIGS. 2a and 2b.

The ovalization caused by the crushing pressure from the bending moment causes a multiaxial stress condition in the typically laminated material of the shell and this increases the stresses in the cap, see FIG. 3. This may lead to the formation of interlaminar cracks (delamination and skin debonding)—for further explanation reference is made to the article "Structural testing and numerical simulation of a 34 m composite wind turbine blade" by F. M. Jensen et. al. published by Elsevier in Composite Structures 76 (2006) 52-61) in the material and consequently weaken the construction a little more each time it is loaded. The interlaminar cracks will also decrease the buckling resistance of the caps consequently building an increased risk of buckling failure of the blade.

If the transformation of the curvature of the profile's cross-section is prevented and the multiaxial stress condition of the laminated material is reduced or eliminated, the buckling resistance of the caps and thereby the ultimate strength of the entire profile, is increased significantly.

It is therefore an object of the present invention to provide an aerodynamic profile with improved resistance against buckling failure of the profile.

It is also an object of the present invention to provide an aerodynamic profile with improved resistance against formation of interlaminar cracks in the facing.

It is another object of the present invention to provide an aerodynamic profile with reduced weight.

It is yet another object of the present invention to provide an aerodynamic profile with improved overall strength and overall stiffness.

It is a further object of the present invention to provide a reinforced cap part for an aerodynamic profile.

It is yet another object of the present invention to provide an aerodynamic profile that can be produced at a reduced manufacturing cost compared to the existing solutions.

It is a further object to provide an aerodynamic profile capable of working under severe aerodynamic loads and to optimise the aerodynamic performance, e.g. energy output of the profile.

It is yet another object to provide a method for constructing a reinforced aerodynamic profile.

It is still another object to provide a method for constructing a reinforced cap part for an aerodynamic profile.

It is further an object of the present invention to provide alternatives to the prior art.

In particular, it may be seen as an object of the present invention to provide an aerodynamic profile that solves the above mentioned problems of the prior art by providing the aerodynamic profile with a reinforcing element e.g. such as described by way of the examples of the following disclosure.

According to a first aspect of the invention, the above-mentioned and other objects are fulfilled by provision of an aerodynamic profile comprising a facing having an outer surface with a substantially transverse curvature, and at least one straight reinforcing element for increasing the strength of the facing against flapwise forces by inhibiting an increase of the mutual distance in the edgewise direction between two points of the facing where the at least one internal reinforcing element is attached to the facing, the at least one reinforcing element having a thickness that is less than twice the maximum thickness of the facing.

The aerodynamic profile may for example constitute a wind turbine blade in a vertical axis wind turbine, such as a Darrieus wind turbine, a wind star turbine, etc., or a wind turbine blade in a horizontal axis wind turbine, such as common modern wind turbines usually three-bladed, sometimes two-bladed or even one-bladed (and counterbalanced), etc. The aerodynamic profile may also constitute an aerofoil device or a wing profile used in the aeronautical industry, such as a helicopter wing, an airplane wing, etc.

The aerodynamic profile may be applicable not only to wind, but also to a variety of water flows, including free-flow (rivers, creeks), tidal flow, oceanic currents, wave motion, ocean wave surface currents, etc.

The facing or shell of the aerodynamic profile may preferably, but not exclusively, comprise a composite or laminated material. The material may preferably, but not exclusively, comprise fibreglass and/or carbon fibres and/or other durable and flexible materials typically with a high strength/weight ratio. This may further comprise at least in part light weight metals or alloys. The facing may typically be a laminate or sandwich-construction.

The at least one internal reinforcing element is connected with at least two connections to an inner surface of the aerodynamic profile with a substantially transverse curvature between the two connections. Preferably, in the context of this application a reinforcing element is distinct from a traditional girder being a structural load-carrying element. A force in the flapwise direction applied to the facing between the two connections and urging the facing towards the inner volume of the facing also urges the two connections away from each other. However, the reinforcing element keeps the two connections in substantially mutually fixed positions and thus prevents the distance between the connections from increasing thereby strengthening the facing against forces in the flapwise direction. Thus, the reinforcing element desirably has a high tensional strength while the reinforcing element need not be capable of resisting compression forces. Preferably, the reinforcing element has a straight shape, such as the shape of a rod or a stretched wire or a planar member. If the shape of the reinforcing element is not straight, the shape of the reinforcing element could be straightened when subjected to stretching forces leading to movement of its end points and obviously, this is not desired.

Since the reinforcing element is required to have a high tensional strength only, i.e. the reinforcing element need not carry other loads; the reinforcing element is preferably thin so that its weight and cost are kept at a minimum. The thickness of the reinforcing element is preferably less than twice the maximum thickness of the facing, more preferred less than 1.5 times the maximum thickness of the facing, even more preferred less than the maximum thickness of the facing, still more preferred less than 0.75 times the maximum thickness of the facing, most preferred less than 0.5 times the maximum thickness of the facing.

The connections on the inner surface of the profile may in principle be positioned anywhere on the inner surface but it should be observed that the chosen positioning causes the reinforcing element to be able to provide a reasonable and useful reinforcing effect in the profile. The connection of a reinforcing element to connecting points on the inner surface of the profile prevents the negative effects of buckling and ovalization as described above. The connections may comprise any suitable kind of joint such as welded, glued, melted, fused or other simple mechanical connections. The reinforcing element itself may comprise the connections or it may comprise additional connections or connection parts adapted to engage or cooperate with the connections on the inner surface of the profile. The additional connections or connection parts must be sufficiently rigid to maintain their shape when subjected to tension in order to properly cooperate with the reinforcing element to prevent the connections on the facings from being displaced away from each other. In embodiments, the reinforcing element is connected to an inner surface of the facing of the profile. Preferably, the inner surface of the facing is shaped in a manner corresponding to the outer surface thereof, i.e. having a substantially transverse curvature. The reinforcing element may therefore preferably be so positioned on the inner surface of the facing that there will be a certain space (or distance) between the reinforcing element and the inner surface of the profile.

The reinforcing element secures and keeps the transverse curvature of the profile substantially unchanged when the aerodynamic profile is loaded by forces in the flapwise direction. This in turn causes the overall strength of the aerodynamic profile to increase significantly since the resistance against buckling is increased. With the reinforcing element according to the invention, the dimensions of the material(s) used for the profile's facing may further be drastically reduced compared to currently available solutions and thus facilitates lower dynamic loads on the other parts of the system, improved handling and transportation characteristics of the profile and of course also a reduction of material costs.

In an embodiment of the invention the aerodynamic profile further comprise(s) shoring means in longitudinal direction along at least a part of the aerodynamic profile. The shoring means is/are provided to strengthen and/or reinforce the profile in its longitudinal direction.

In an embodiment of the invention the shoring means is/are embedded in or form(s) part of the facing of the profile. Embedded shoring means may preferably, but not exclusively, comprise one or more layers or tapes of a suitable fibre material. In an embodiment one or more fibre tapes will be placed between the layers of the above described laminate type construction.

For example, at least one girder may be provided to primarily strengthen and reinforce the aerodynamic profile in its longitudinal direction and may also be referred to as a web. In this application, the girder or web should be construed as any kind of elongate constructional element capable of taking up loads, such as a beam or a spar e.g. shaped as an I-profile or an U-profile preferably made from fibre reinforced plastics or other suitable material. The web may substantially extend through the length of the blade. However, it may also be preferred to provide the aerodynamic profile with two or more separated webs in the longitudinal direction of the aerodynamic profile, especially for facilitating handling or transporting purposes. In principle, any number of webs may be applied, however for the sake of simplicity and for keeping the overall weight of the blade as low as possible a number of one or two webs is preferred.

In this manner, an aerodynamic profile according to the invention may be produced by prefabrication of a minimum number of individual elements and then subsequently assembled to form the total aerodynamic profile. Other variations of applying shoring means in the facing of the profile may be used such as embedded metal- or fibre-wires or textiles.

Other embodiments of the invention may comprise shoring means in substantially transverse, diagonal or any other suitable directions, or combinations thereof, of the aerodynamic profile.

In an embodiment of the invention the shoring means comprise at least one internal girder connected to at least a part of the inner surface of the facing of the aerodynamic profile.

In embodiments of the invention, the connection(s) between the internal girder and the inner surface of the facing may be placed at any suitable position on the parts. Preferably, but not exclusively, the connections may be adapted in one or more points, along one or more lines or in any kind of spatial configuration. Furthermore, the connections may comprise any suitable kind of mechanical joint such as a welded, glued, melted, fused or other simple mechanical connection.

In another embodiment according to the present invention the at least one internal girder comprises a box girder or a box beam. The box girder or box beam may be adapted to accommodate different kinds of equipment on the inner sides thereof. Examples of equipment are measuring instrumentation, control mechanisms and/or systems and servo motors for powering mechanisms on or within the aerodynamic profile. The sides of the box girder may vary in thickness in its longitudinal and/or transverse direction(s) and the shape and/or the perimeter length of the cross-section of the girder may also vary along its longitudinal extent.

Obviously, the different kinds of equipment mentioned above may also be associated with any of the other embodiments of the present invention.

In an embodiment the box girder or box beam is of a substantially polygonal cross-section. The cross-section of the box girder or box beam may have any polygonal shape such as substantially rectangular, triangular, circular, oval, elliptical etc. but is preferably rectangular or substantially square.

In other embodiments the at least one reinforcing element is connected to the inner surface of the facing and/or to the shoring means with at least two connections. The reinforcing element may preferably be connected with connections positioned on those parts of the inner surface of the aerodynamic profile that form the caps. The connection of a reinforcing element to connections on the caps, i.e. two connecting points on the inner surface of the profile, prevents the negative effects of buckling and ovalization of the caps. The connections may comprise any suitable kind of joint such as welded, glued, melted, fused or other simple mechanical connections. The reinforcing element itself may comprise the connections or it may comprise additional connections or connection parts adapted to engage or cooperate with the connections on the caps. Apart from being connected to the inner surface of the facing the reinforcing element may also be connected to the shoring means.

In embodiments in which the shoring means comprise two or more internal girders or a box girder the reinforcing element may be connected solely to the shoring means.

In particular embodiments of the invention at least one of the at least two connections between the reinforcing element and the inner surface of the facing and/or the shoring means is continuous along at least one or more parts of said facing and/or said shoring means.

In an embodiment of the invention the at least one reinforcing element is a bar or a rod-like element. The element may be solid or hollow or any suitable combination thereof. Alternatively, the element may comprise wire, rope, cord, thread or fibres. They may be applied individually or may be applied as a number of individual elements together forming a "thicker" element. Particularly, the element may comprise fibres of very high stiffness and strength such as, but not limited to, aramid fibres.

In yet another embodiment of the invention the at least one reinforcing element is a plate. The plate element may be solid or hollow or any suitable combination thereof. The plate material may comprise any of metal, metal alloy, wood, plywood, veneer, glass fibre, carbon fibre and other suitable materials such as e.g. one or more composite materials. The element may further be provided as netting or a web comprising one or more of wire, rope, cord, thread or fibres. The plate element may alternatively comprise a textile or a fabric material. The fabric material may be manufactured from materials such as, but not limited to carbon fibres or aramid fibres thus providing a high strength and a low weight. If suitable, glass fibres may also be used.

The mentioned materials may also be combined to any construction. Thus, in another embodiment the at least one reinforcing element is a laminate or a sandwich construction.

In another embodiment of the invention the plate or laminate comprises one or more cut-outs. The cut-outs may be made in any suitable kind of pattern. The cut-outs may be provided in order to provide a plate or laminate with a thickness that is strong enough to withstand handling during construction without having to protect the profile too much. Furthermore, the cut-outs may provide passage for any additional wiring or other equipment there through and also reduce the overall weight.

In yet another embodiment the reinforcing element and the shoring means are fixedly interconnected. The interconnection may comprise any suitable kind of joint such as welded, glued, melted or fused connections as previously described.

In a further embodiment the reinforcing element and the shoring means are releasable interconnected. The releasable interconnection may comprise any suitable kind of joint such as a snap-fit, press-fit, groove-and-tongue connection or other simple mechanical connection. A releasable interconnection may be used to provide an aerodynamic profile with an increased degree of flexibility.

In a particular embodiment the reinforcing element is connected to the inner surface of the aerodynamic profile in at least two connections points so that at least one space is defined between the reinforcing element and the inner surface. The two connection points may be on a cap part of the profile that may preferably have an outer surface corresponding to the surface of the facing of the aerodynamic profile. The outer surface of the cap part may be substantially flat/even or have a substantially transverse curvature.

In further embodiments the at least one space between the reinforcing element and the inner surface of the profile is at least partly filled with a filler material. The filler material may comprise one or more substances. The substances may have different physical, chemical or mechanical properties and may be mixed so as to provide one or more specific characteristics such as insulating power, stiffness, low weight, high or low conductivity etc. Preferably, however, the filler material may be a foamed material characterised by e.g. low weight and convenient working properties for forming a suitable surface that is easily further processed e.g. by further laminating with fibres or fibre tapes. Particularly, the foamed material may comprise a PVC or PVC-based material particularly capable of absorbing pressure forces. Particularly, the foamed material may be provided as a prefabricated and/or pre-shaped element with a first (outer) surface substantially corresponding to the curvature of profile along the inner surface thereof, and a second (inner) surface being substantially plane or flat. The second surface of the pre-shaped foamed element may then form an even and aligned basis for the reinforcing element, particularly, but not exclusively, if the reinforcing element is a plate or laminate. The provision of a pre-shaped foamed element can be especially advantageous since the foamed element then may act as a mould or form for the positioning and/or connection of the reinforcing element and/or for the overall construction of the relevant part. This means that the need for a custom-made mould, e.g. of glass fibre for constructing the relevant part can be eliminated, thus reducing manufacturing costs of the relevant part.

The filler material may also or instead comprise a fluid or gaseous material being e.g. injected, sprayed or blow moulded into the space. The fluid or gaseous material may be of a kind that hardens when e.g. exposed to air. In embodiments comprising a fluid or gaseous filler material relevant means may be provided in connection with e.g. the reinforcing element for retaining such material.

In yet another embodiment the cap part may preferably be a separate cap part. The separate cap part may be manufactured in an individual manufacturing process and then provided for connection to the other part(s) of the profile when these are ready for assembly. The outer surface of the separate cap part is substantially aligned with the facing such that the outer surface of the profile has a smooth and substantially unbroken surface when they are connected.

The separate cap part may be a single piece corresponding to substantially the whole length of the profile or it may comprise smaller/shorter sections facilitating easier handling and assembling.

The providing of a reinforcing element according to the invention may preferably be integrated in the manufacturing process of the profile. However, a subsequent fitting may also be possible if the assembling conditions allow so.

Particularly, if the reinforcing element is provided on a separate cap part, a subsequent fitting of the cap part comprising the reinforcing element with the facing and/or the shoring means in a separate assembling procedure, is applicable. This may not only save production time, but also allow for an improved control of the material characteristics of the separate cap and provide the possibility of pre-stressing the reinforcing element to a desired level. Furthermore, the aerodynamic profile may be manufactured in sections and assembled on site if suitable. It will also be possible to renew or replace cap parts on existing aerodynamic profiles.

In yet another embodiment the reinforcing element(s) or the materials of the reinforcing element is/are arranged in such manner that during flapwise loading of the profile, the reinforcing element is implementing shear forces in the surface of the profile. The shear forces will twist the aerodynamic profile, and thereby couple bending and torsion of the profile. This effect may preferably, but not exclusively, be achieved by arranging the reinforcing elements at an angle of less than 90° in relation to the longitudinal axis of the profile. If a plate of fibre reinforced materials or a textile is used the fibre directions must be less than 90°, but more than 0° in relation to the longitudinal axis of the profile.

The coupling of the bending and the torsion can be used to change the angle of attack of the profile during wind gust or similar extreme aerodynamic conditions. The unloading of the profile will decrease the maximal stresses in the profile and thereby decrease the weight.

The coupling of the bending and the torsion may also optimize the power output from the profile.

In further embodiments the reinforcing element(s) is/are equipped with or consist(s) of electrical installations, such as piezoelectric installations, that may be activated by means of voltage, current, electric or magnetic field, whereby the length of the reinforcing element changes and/or stresses are imposed on the element. By this it is possible to change the curvature of the profile's surface and thereby change the aerodynamic properties of the profile. With these installations it is possible to optimize the performance of the aerodynamic profile.

With respect to each one of the above mentioned embodiments of the invention the aerodynamic profile may further comprise means for associating the profile with a relevant structure. If the aerodynamic profile is a wind turbine blade such means may e.g. be fittings or connections for connecting the blade to the hub or the main axle of the turbine.

The aerodynamic profile according to the invention may further comprise other internal or external equipment suitable for use in the relevant structure they become a part of.

The aerodynamic profile according to the invention may also advantageously be part of a load-bearing construction such as a tower for carrying a wind turbine.

In another aspect of the present invention, it may be seen as an object to provide a method for facilitating easy assembling/construction of an aerodynamic. profile comprising a reinforcing element. Particularly, it may be seen as an object to provide an assembling of reduced complexity of an aerodynamic profile with one or more reinforcing elements on an inner surface thereof.

According to a second aspect of the invention, the above-mentioned and other objects are fulfilled by provision of a method for manufacturing a reinforced aerodynamic profile comprising the steps of providing at least a part of a facing of the profile, and
providing shoring means in connection with said facing, and
providing at least one reinforcing element connected in at least two connection points to an inner surface of the profile, and optionally
providing a filler material in a space between said reinforcing element and said inner surface of the profile.

According to the second aspect of the invention at least a part of a facing of an aerodynamic profile is constructed and connected to shoring means. The construction may preferably comprise building up layers of one or more types of fibre materials fibre material. The type of shoring means and connection(s) between such means and the facing may be one or more of those described in connection with the first aspect of the invention. The same applies for the provided at least one reinforcing element and its connections to the inner surface of the profile. The reinforcing element may be connected in at least two connection points on one side of the inner surface of the profile, e.g. two points on one side of an inner surface of at least a part of a facing of the profile. The facing part may especially be the cap part of the profile.

Particularly, but not exclusively, the reinforcing element may connect two points on the inner surface of a cap part of the profile. The inner surface of the cap part may preferably have a curvature following the transverse curvature of the outer surface of the facing. By connecting the reinforcing element to two connection points on a curved cap part, a space (or distance) is created between the parts. According to the second aspect of the invention this space may advantageously be at least partly filled with a filler material. The filler material may preferably be a substantially solid material such as a foamed material. Such foamed material may preferably be shaped beforehand to fit in the space between the reinforcing element and the cap part as described in connection with the first aspect of the invention. It may then provide a solid basis for the at least one reinforcing element and also provide an improved stiffness of the whole cap part. The reinforcing element may also be so positioned as to connect at least one point on the inner surface of the profile not being on the cap part. In such embodiments the filler material may be provided as described between the reinforcing element and the inner surface, at least for improving the strength and/or stiffness of the relevant part of the profile. The filler material may be provided in the space before the connection of the at least one reinforcing element or vice versa.

Below the invention will be described in more detail with reference to the exemplary embodiments illustrated in the drawings, wherein FIG. 1a is a schematic view of a cross-section of an aerodynamic profile indicating the crushing pressure on the profile from the bending moment acting on the profile in operation.

FIG. 2b is a schematic cross-sectional view of the box profile showing three different cross-sections of the profile in different positions corresponding to the three sectional cuts in FIG. 2a.

FIG. 5b is a schematic cross-sectional view corresponding to sectional cut E of FIG. 5a.

The figures are schematic and simplified for clarity, and they merely show details which are essential to the understanding of the invention, while other details have been left out. Throughout, the same reference numerals are used for identical or corresponding parts.

Figure 1A:
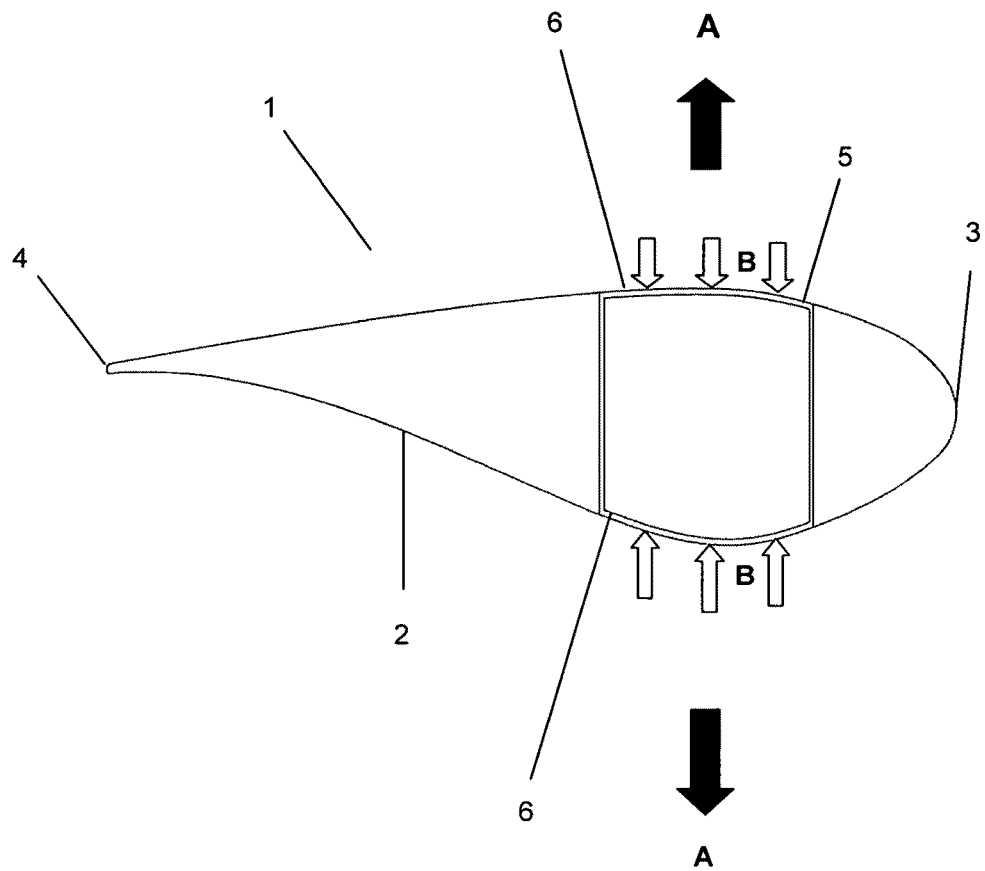
FIG. 1b is a schematic view of part of the cross-section of an aerodynamic profile forming the box profile and indicating the potential deformation (ovalization) caused by the crushing pressure (deformed state shown as dotted lines).

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1a shows a principle cross-section of an aerodynamic profile 1 having a facing 2 with a leading edge 3 and a trailing edge 4. Also indicated are the box profile 5 and the cap parts 6 thereof. The cap parts 6 are indicated as the upper and lower sides of the box profile 5. As previously described, the profile is primarily loaded in the flapwise direction by aerodynamic and inertia forces. The flapwise direction is illustrated by arrow A in FIG. 1a. The forces induce a bending moment on the profile and create a crushing pressure indicated by arrows B. The crushing pressure is also referred to as the Brazier effect (reference is made to the article "Structural testing and numerical simulation of a 34 m composite wind turbine blade" by F. M. Jensen et. al. published by Elsevier in Composite Structures 76 (2006) 52-61).

Figure 1B:
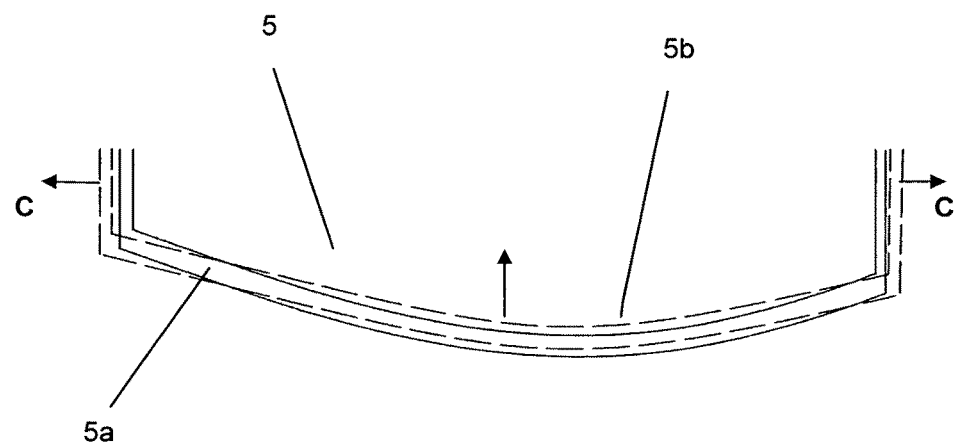

FIG. 1b shows an enlarged sectional cross-section of the box profile 5 indicating an example of the deformation of the box profile 5 with character of an ovalization caused by the bending moment on the profile. In the figure a neutral position of the box profile 5 is indicated with full drawn line as reference 5a and a loaded or ovalized (flattened out) position is indicated by dotted line 5b. Further indicated are directions that the box profile 5 may move toward when it is loaded, referenced by arrows C.

Figure 2A:
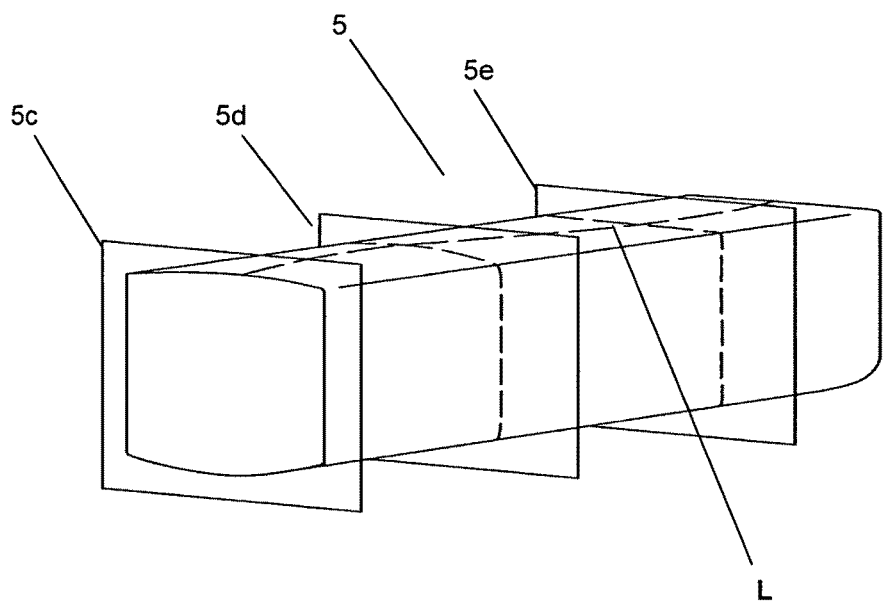
FIG. 2a is a schematic perspective view of the box profile indicating three sectional cuts illustrated in FIG. 2b and further indicating a buckling line in the longitudinal direction of the box profile (dashed line).
Figure 2B:
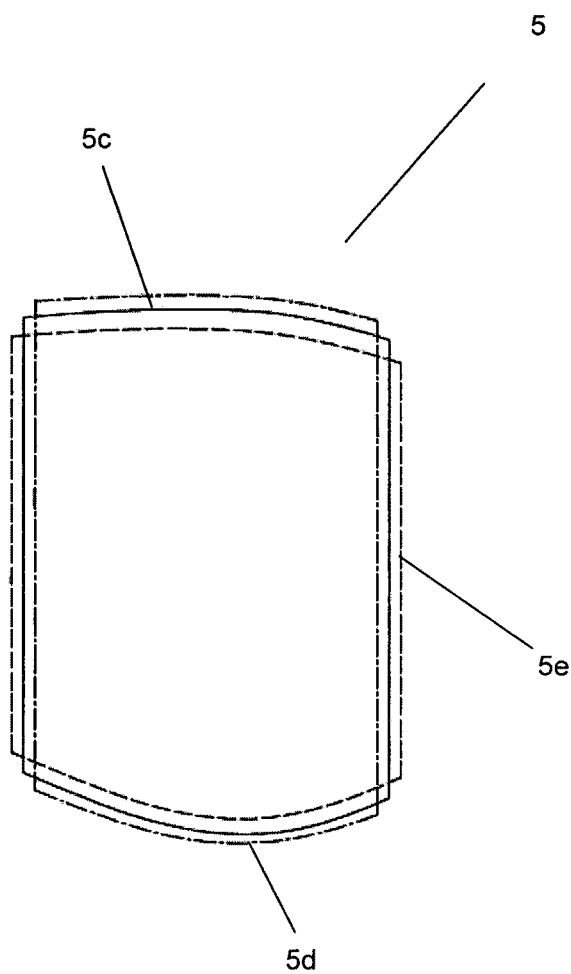

FIG. 2a shows a schematic perspective view of at least a part of the box profile 5 with the indication of three sections, referenced as 5c, 5d and 5e and further described in FIG. 2b. Also illustrated by dotted, sine-like line L is an indication of a buckling pattern of the profile. Buckling causes the shape of the cross-section of the profile to vary (or "transform") along the profile's longitudinal direction. The possible nature of such variation of cross-sections of the profile is shown by way of examples in FIG. 2b.

FIG. 2b thus shows a schematic view of the three different positioned cross-sections 5c, 5d and 5e of the profile 5. 5d and 5e indicate cross-sections in a loaded or ovalized state at different positions along the profile 5. 5c indicates the cross-section in a neutral position at another position along the profile. The figure is intended to support the understanding of how the forces on the profile cause its cross-section to vary, thus adding to a fatiguing process of the profile.

Figure 3:
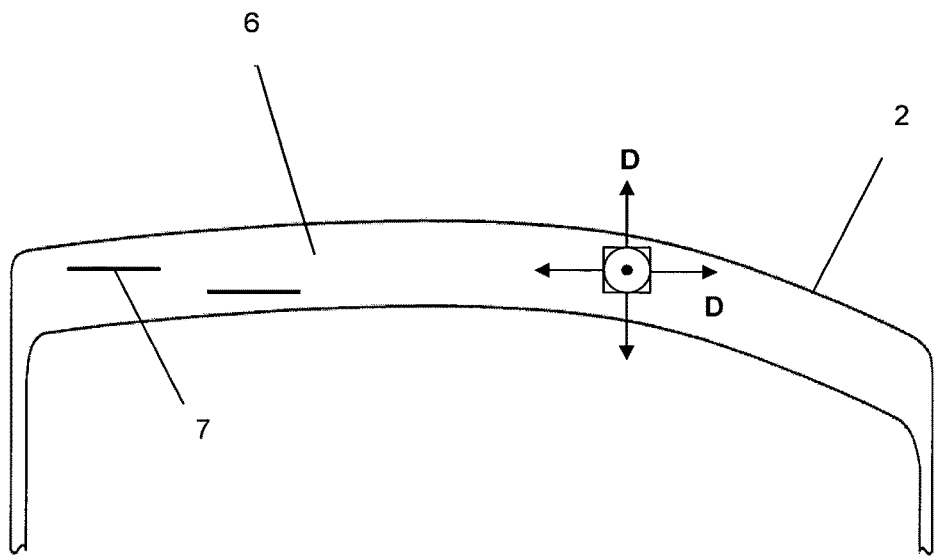
FIG. 3 is a schematic view of part of a cross-section of a cap part of the profile showing in principle the multiaxial stress condition and examples of crack formation in the cap part as a result of the deformation.

FIG. 3 shows in part a schematic cross-section of the box profile, particularly focussed on a cap part 6. The figure indicates by way of arrows D the multiaxial stress condition that arises in the laminate surface, i.e. the facing 2, of the profile 1 as a result of the deformation (the ovalization) caused by the bending moment on the profile. Also indicated are examples of interlaminar cracks 7 in the facing 2 that are potentially created due to the multiaxial stress condition in the laminate. The layers of the laminate may debond, i.e. simply be torn apart as a result of the stress condition.

Figure 4:
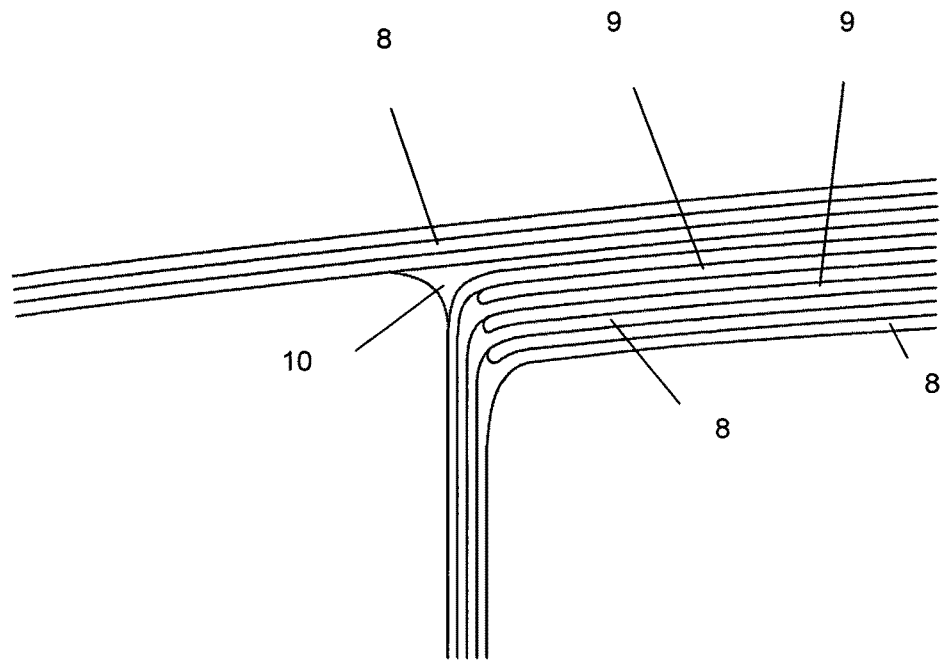
FIG. 4 is an enlarged schematic sectional view of an example of a facing according to the invention.

FIG. 4 shows a schematic, enlarged cross-sectional view of an example of how a facing for an aerodynamic profile may be a laminate comprising many layers of one or more specific fibre materials. In FIG. 4 layers of fibre glass are indicated by reference 8 and a layer of another material such as carbon fibres is indicated 9. Further indicated are layers 10 of a bonding material such as glue.

Figure 5A:
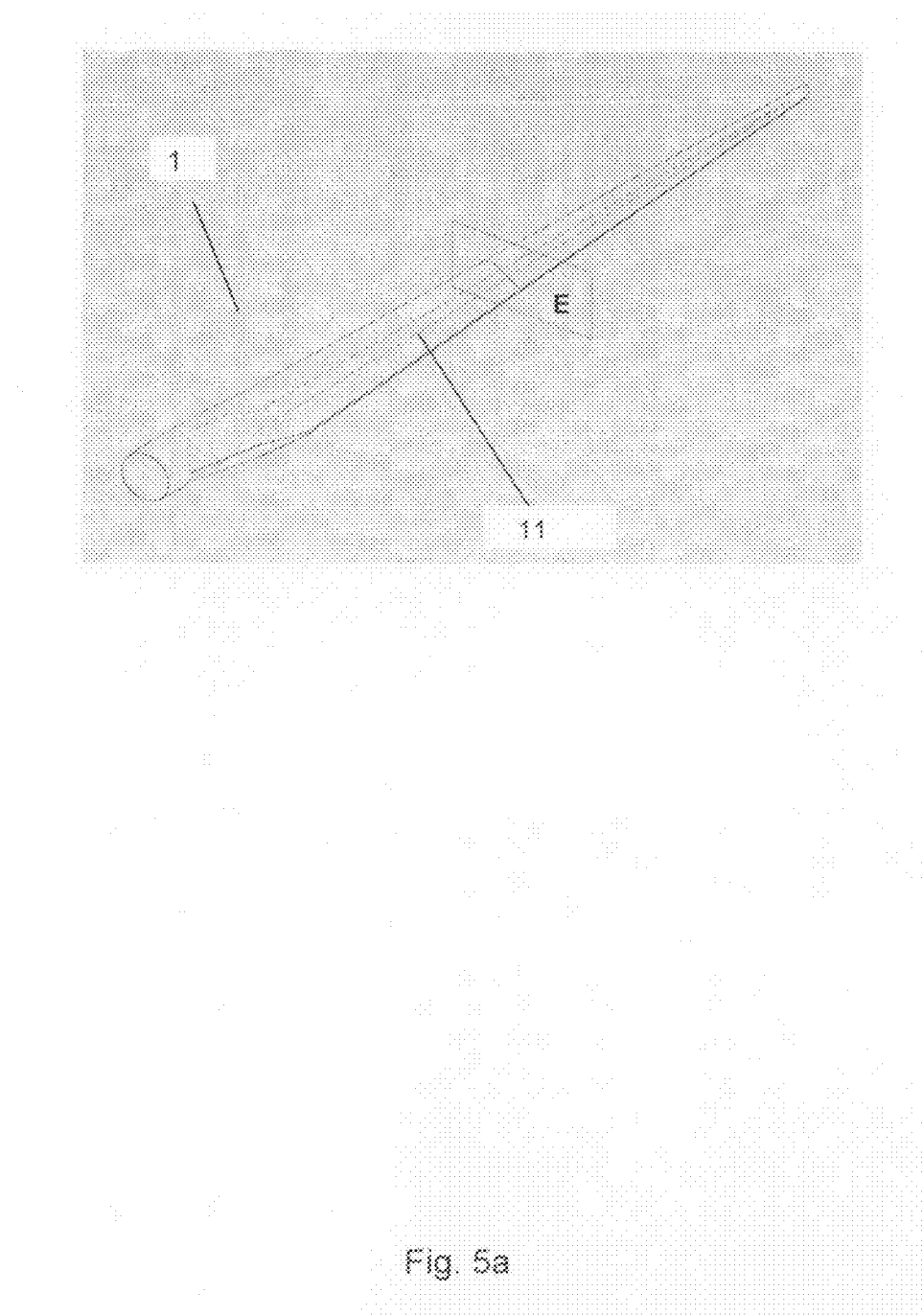
FIG. 5a is a schematic perspective view of the aerodynamic profile indicating shoring means as an embedded part of the facing and further indicating a sectional cut E shown in detail in FIG. 5b.

FIG. 5a is a schematic total perspective view of an aerodynamic profile 1 indicating the longitudinal positioning of the shoring means (by dashed line 11); here in the form of a single internal girder 21. Also indicated is sectional cut E, described in more detail for FIG. 5b.

Figure 5B:
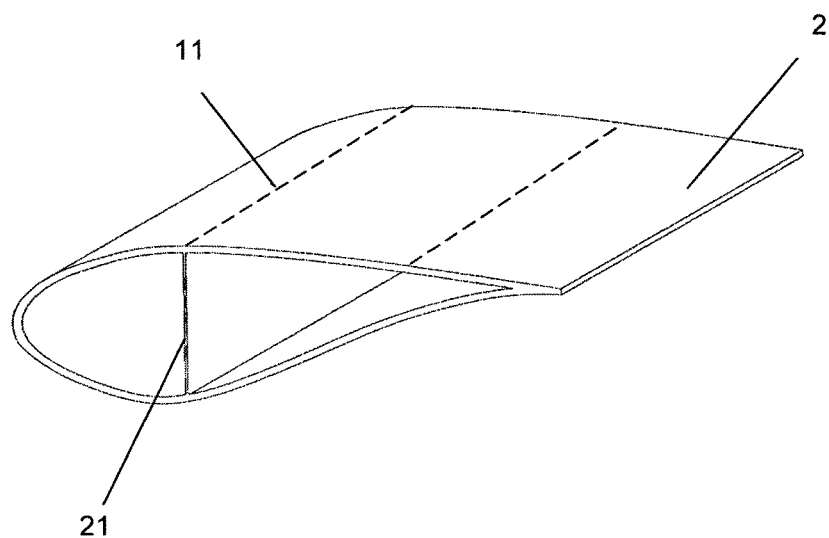

FIG. 5b is an enlarged view of the sectional cut E of FIG. 5a showing the shoring means 11 in the form of a single internal girder 21. It can also be seen how the internal girder spans the opposite sides of the facing 2 of the profile.

Figure 5C:
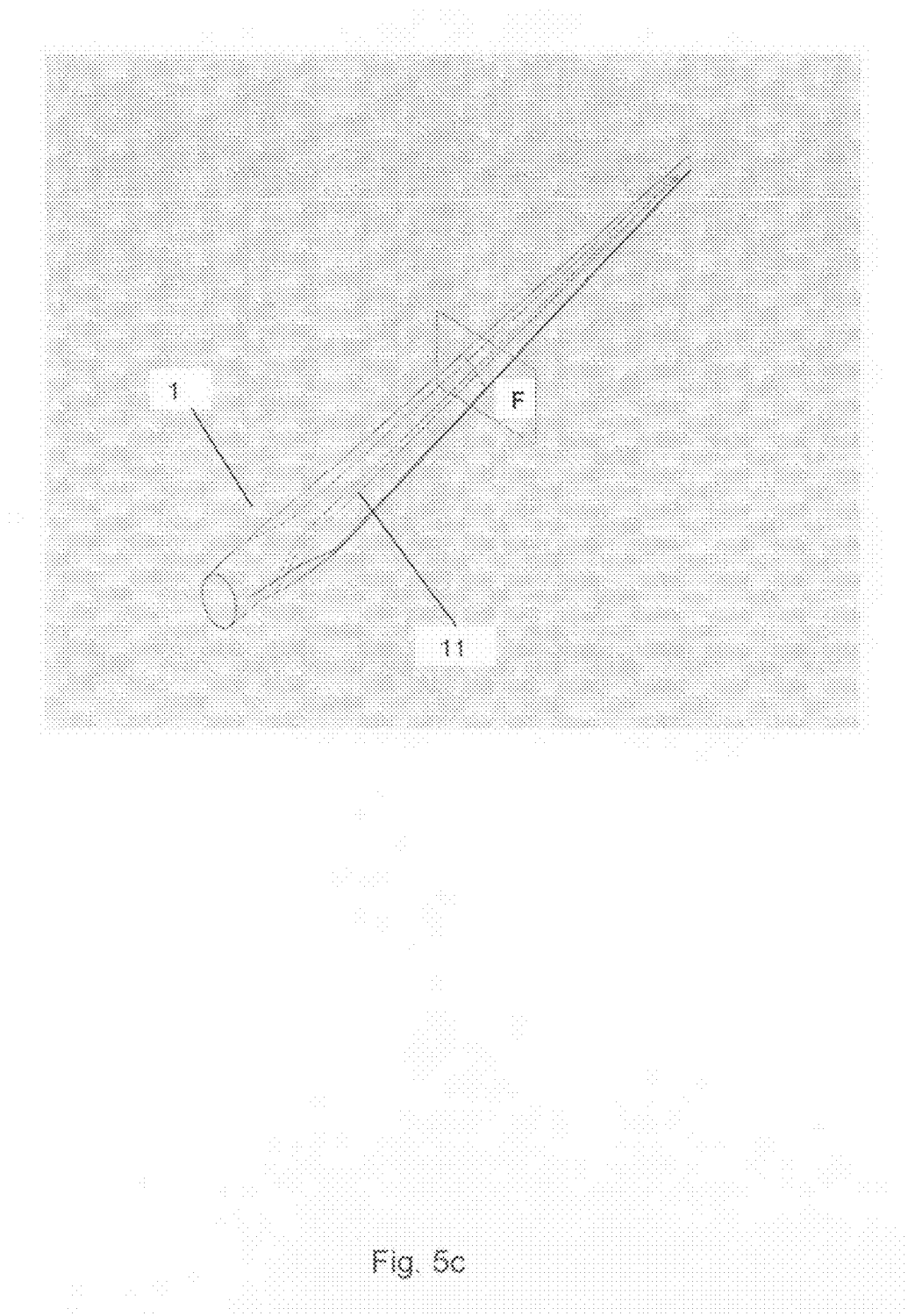
FIG. 5c is a schematic perspective view of the aerodynamic profile indicating shoring means as internal girders in the form of a box profile and further indicating a sectional cut F shown in detail in FIG. 5d.

FIG. 5c is a schematic total perspective view of an aerodynamic profile 1 indicating the longitudinal positioning of the shoring means (by dashed line 11); here in the form of a box profile 12 comprising two internal girders 21. Also indicated is sectional cut F, described in more detail for FIG. 5d.

Figure 5D:
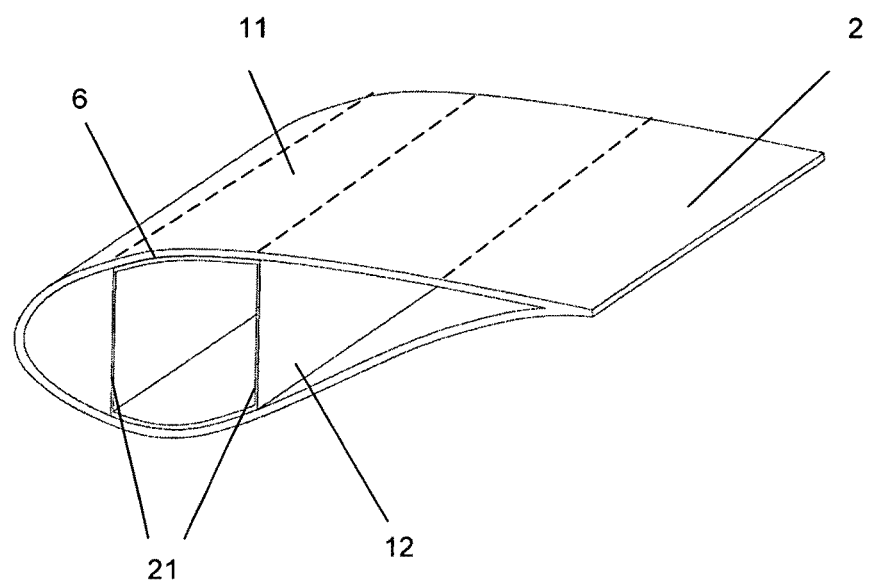
FIG. 5d is a schematic cross-sectional view corresponding to sectional cut F of FIG. 5c.

FIG. 5d is an enlarged view of the sectional cut F of FIG. 5c showing the shoring means 11 in the form of two internal girders 21. It can also be seen how the two internal girders span the opposite sides of the facing 2 of the profile thereby building the box profile 12. The "top and bottom" sides of the box profile 12 build the caps or cap parts 6.

Figure 6A:
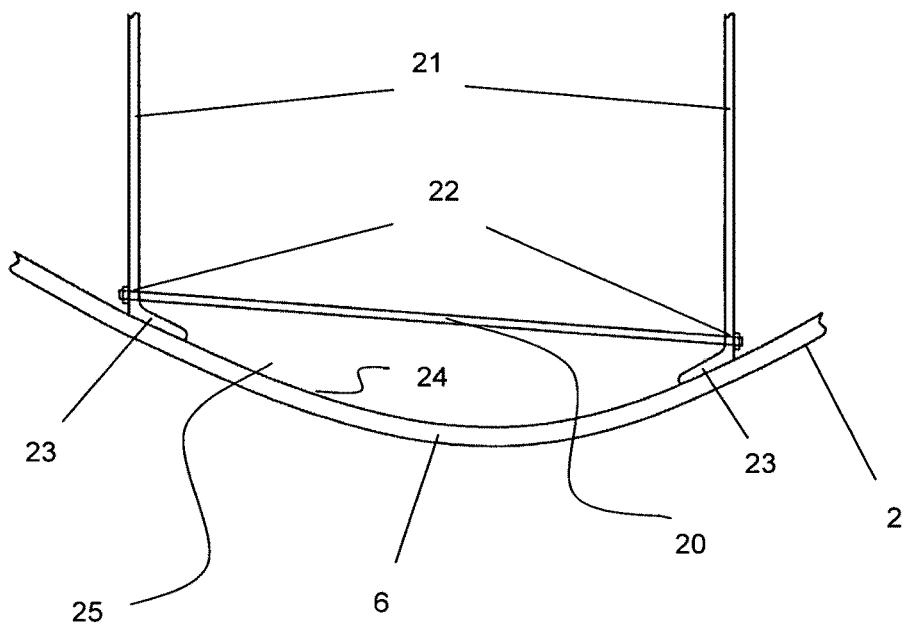
FIG. 6a is a schematic partial cross-section showing a reinforcing element connected to shoring means in the form of two internal girders.

FIG. 6a shows a schematic partial view of an example of a box profile 5 of an aerodynamic profile. In addition, the figure shows a part of the profile's facing 2 with an outer surface having a substantially transverse curvature, substantially corresponding to a cap part 6. The box profile 5 in the illustrated example comprises shoring means in the form of two internal girders 21. Also indicated is a reinforcing element 20 in the form of a rod connected to each of the two girders 21 in two connection points 22. The girders 21 are each connected to an inner surface 24 of the profile with connections 23. A space or distance 25 between the reinforcing element 20 and the inner surface 24 of the profile is also indicated.

A force in the upward flapwise direction in FIG. 6a applied to the facing between the two connections 23 will urge the facing towards the inner volume 25 of the facing and also urge the two connections 23 away from each other. However, the reinforcing element 20 keeps the two connections 23 in substantially mutually fixed positions and thus prevents the distance between the connections 23 from increasing thereby strengthening the facing against forces in the flapwise direction. The rod 20 is straight and has a high tensional strength.

Since the reinforcing element is required to have a high tensional strength only, i.e. the reinforcing element need not carry other loads; the reinforcing element is preferably thin so that its weight and cost are kept at a minimum. The thickness of the reinforcing element of the illustrated embodiment is approximately equal to the maximum thickness of cap part.

Since, the reinforcing element need not be capable of resisting compression forces, the rod 20 may be substituted by a wire.

Figure 6B:
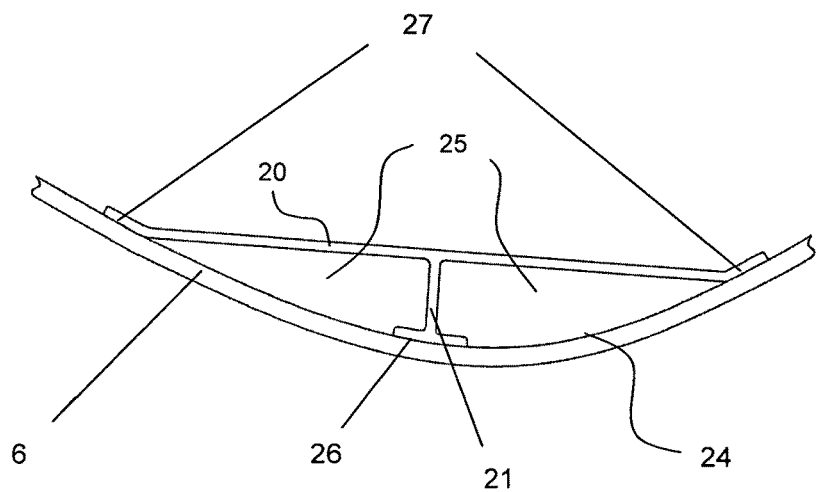
FIG. 6b is a schematic partial cross-section showing a reinforcing element connected to or integrated with shoring means in the form of a single internal girder and to an inner surface of the profile.

FIG. 6b like FIG. 6a shows a schematic partial view of an example of a part of the profile's facing 2 with an outer surface having a substantially transverse curvature, substantially corresponding to a cap part 6. In this example the profile comprises shoring means in the form of a single internal girder 21. The girder 21 is connected to an inner surface 24 of the cap part 6 by connection 26. A reinforcing element 20 shown in the form of a plate or laminate is integrated with, or bonded to (not shown), the girder. The girder is further shown bonded in two connections 27 to an inner surface 24 of the profile. A space or distance 25 between the reinforcing element 20 and the inner surface 24 of the profile is also indicated. The space 25 may actually be two separate spaces split by girder 21 as indicated.

Figure 7A:
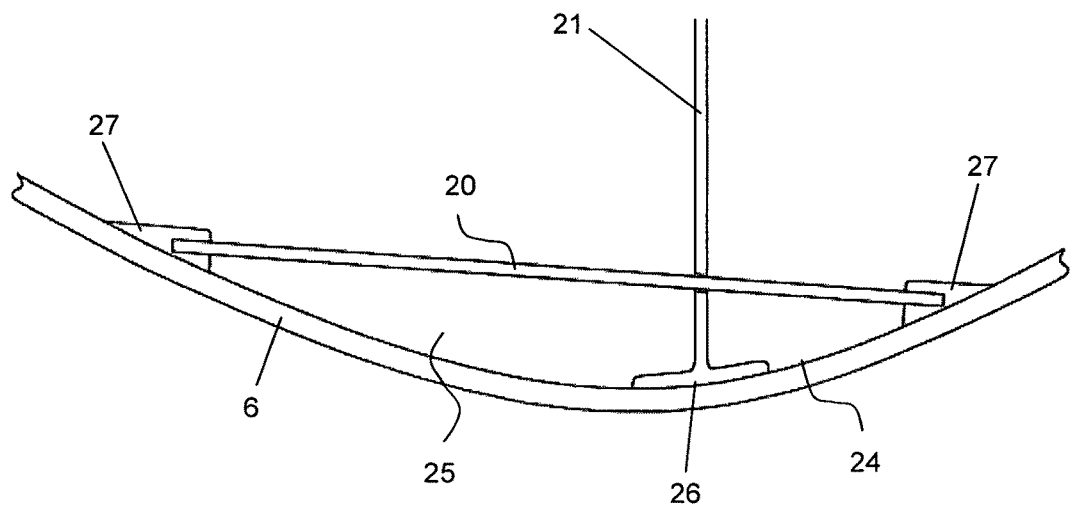
FIGS. 7a-7d are schematic partial cross-sections showing different types of reinforcing elements connected to one or more shoring means and/or to the inner surface of the profile.
Figure 7B:
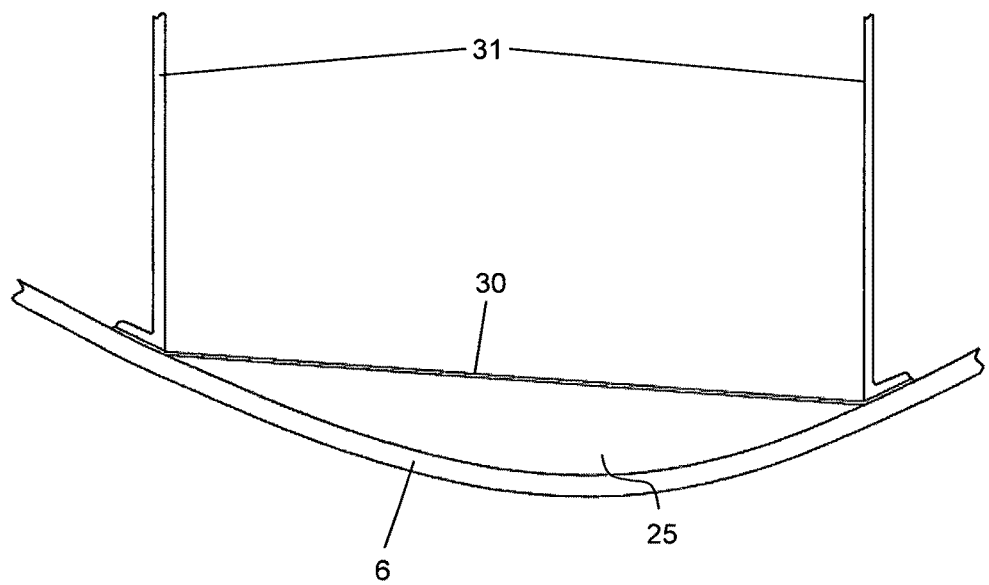
Figure 7C:
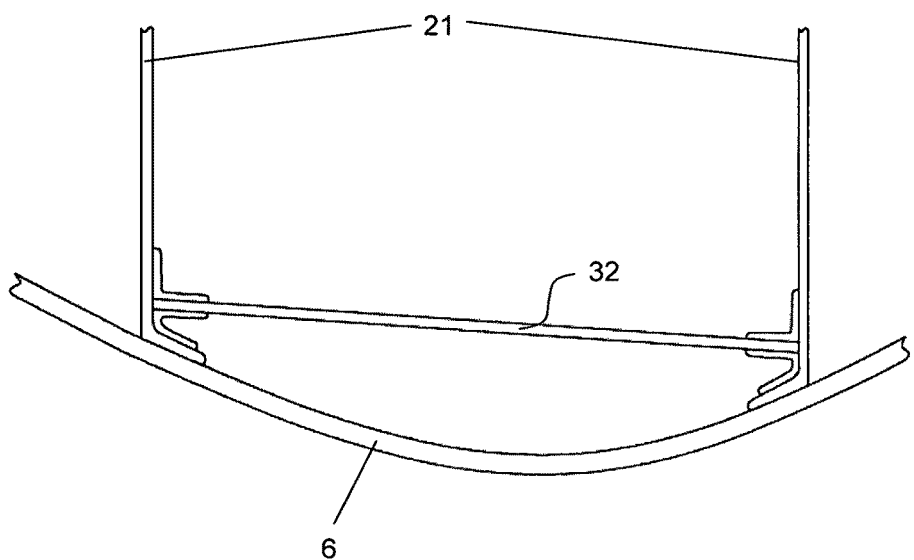
Figure 7D:
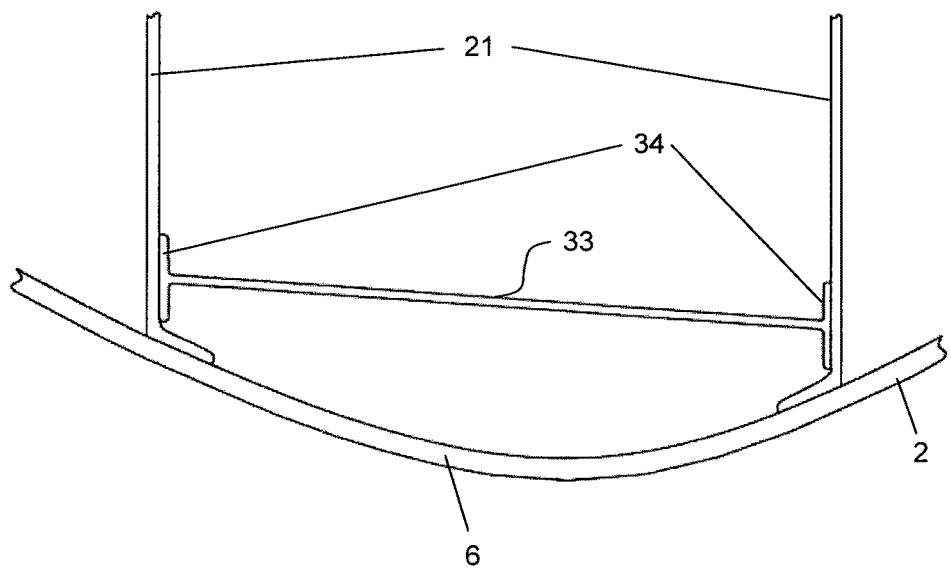

FIGS. 7a-7d also show schematic partial views of examples of the shoring means at the cap part 6 of the profile's facing 2. The figures show how one or more reinforcing elements 20 can be connected to an inner surface 24 of the cap part 6 and/or to the shoring means in the form of one or more internal girders 21. In FIG. 7a the profile comprises shoring means in the form of a single internal girder 21. The girder 21 is connected to an inner surface 24 of the cap part 6 by connection 26. A reinforcing element 20 shown in the form of a rod is connected in two connection points 27 to an inner surface 24 of the cap part 6. A space or distance 25 between the reinforcing element 20 and the inner surface 24 of the profile is also indicated. In the figure the reinforcing element 20 is not connected to the internal girder 21, however the internal girder is provided with a passage or hole (not shown) that the reinforcing element 20 extends through. In FIG. 7b is shown a single reinforcing element in the form of a textile 30 connected in two connection points on the inner surface of the cap part 6. Shoring means in the form of one or two substantially U-shaped internal girders 31 may be bonded on top of the textile (U-shaped girders 31 are only shown in part). In FIG. 7c a reinforcing element in the form of a plate 32 is laminated to the body of each of two internal girders 21 constituting the shoring means. In FIG. 7d is shown a reinforcing element in the shape of a plate 33 comprising one or more feet 34 having a surface of a certain extension for assisting in the bonding of the plate 33 to each of the two internal girders 21.

Figure 7E:
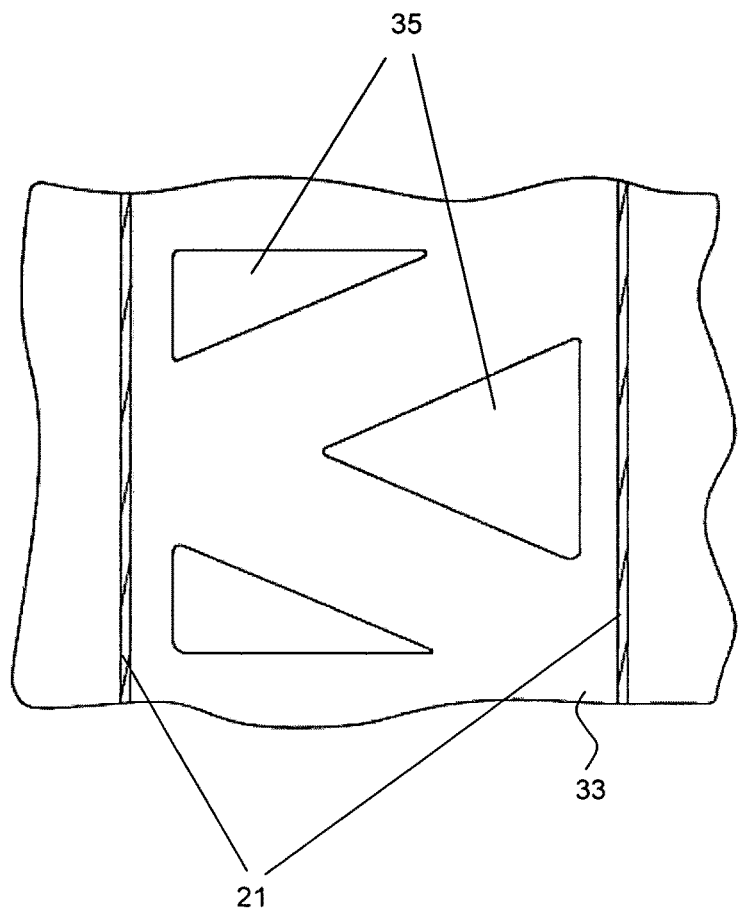
FIG. 7e is a schematic top view of a reinforcing element in the form of a plate or a laminate provided with cut-outs distributed in a pattern.

FIG. 7e is a schematic top view e.g. of the plate 33 of FIG. 7d further comprising cut-outs 35 in the plate 33 distributed in a pattern. Any kind of pattern may of course be applied to any of the reinforcing elements in the form of the described plates or laminates. The figure also indicates an outline of the two internal girders 21 of FIG. 7d.

Figure 7F:
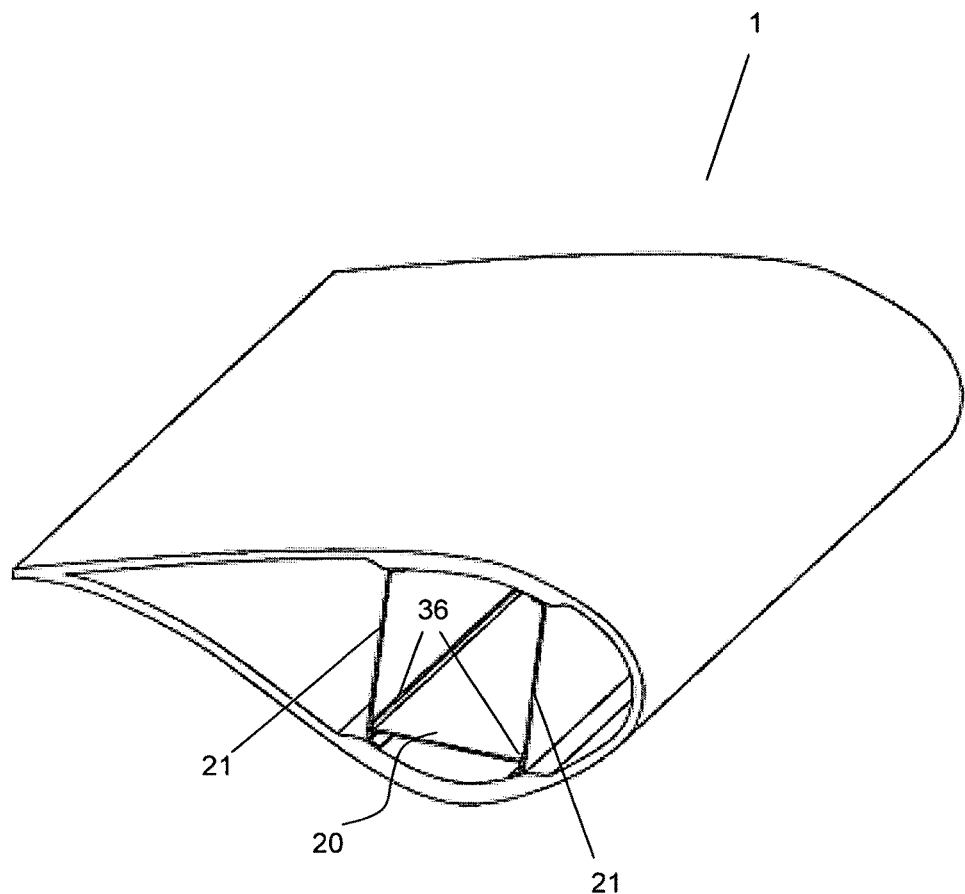
FIG. 7f is a schematic perspective view of a reinforcing element in the form of a plate or laminate positioned in the longitudinal direction of the aerodynamic profile.

FIG. 7f shows in perspective at least a part of an aerodynamic profile 1 comprising a reinforcing element 20 in the shape of a plate or laminate extending substantially through the length of the profile 1. The element 20 is connected with continuous connections 36 to the shoring means in the shape of two internal girders 21. As previously described the element 20. may be connected to the girders 21 at any suitable position by connections 36.

Figure 8:
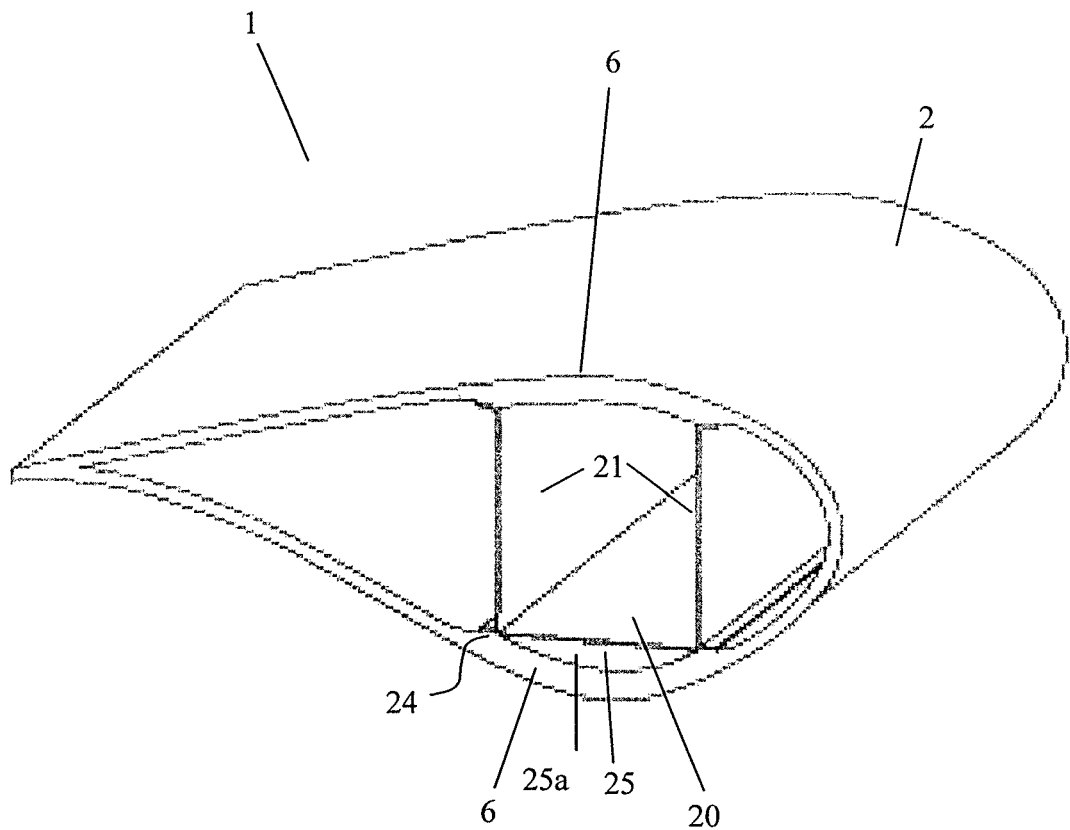
FIG. 8 is a schematic partial cross-sectional view of the box profile wherein the reinforcing element in the form a plate or laminate is integrated in the manufacturing of the aerodynamic profile.

FIG. 8 shows a similar sectional cut of a profile 1 as shown in FIG. 7f. However, in FIG. 8 the reinforcing element 20 in the shape of a plate or laminate or textile is provided as an integrated part of the inner surface 24 of the profile. A space 25 is provided between the reinforcing element and the inner surface. Two substantially U-shaped internal girders 21 are shown bonded to the surface of the reinforcing element that faces the centre of the profile 1 and/or at least also partly to the inner surface 24. The figure is partly intended to illustrate that a reinforcing element may be provided during the manufacturing of the profile's facing and may accordingly become an integrated part thereof when the facing 2 is manufactured, typically by laying down layer upon layer of fibre material in a suitable mould. FIG. 8 further indicates that the caps or cap parts 6 of the profile may constitute a thicker part of the facing 2 than the other parts. In this embodiment it will be particularly advantageous to provide a filler material 25a, e.g., a pre-shaped foamed materiah in the space 25 between the reinforcing element 20 and the inner surface of the cap part 6 since the foamed material may then form an excellent plan/even basis for the positioning of the reinforcing element 20.

Figure 9:
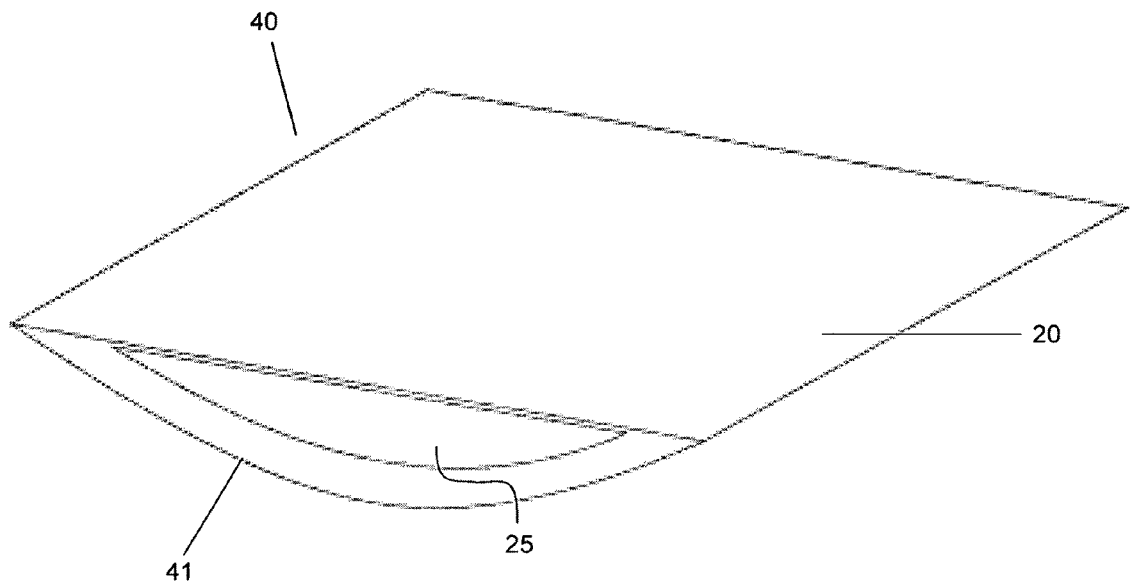
FIG. 9 is a perspective view of a prefabricated reinforced separate cap part.

FIG. 9 is a perspective schematic view of a separate reinforced cap part 40 that is pre-shaped before its assembly with the facing and/or the shoring means of the profile 1. The separate cap part 40 may substantially correspond to the construction of the integrated cap part of FIG. 8. It differs from the integrated cap part of FIG. 8 in that it is an individual element that can be assembled with the facing 2 and the shoring means in a procedure apart from the structural build-up of the profile 1, such as described with respect to FIG. 8. The reinforcing element 20 is e.g. a plate, the "open" or "profile centre facing" surface of which is shown as being substantially flat or plan.

Figure 10:
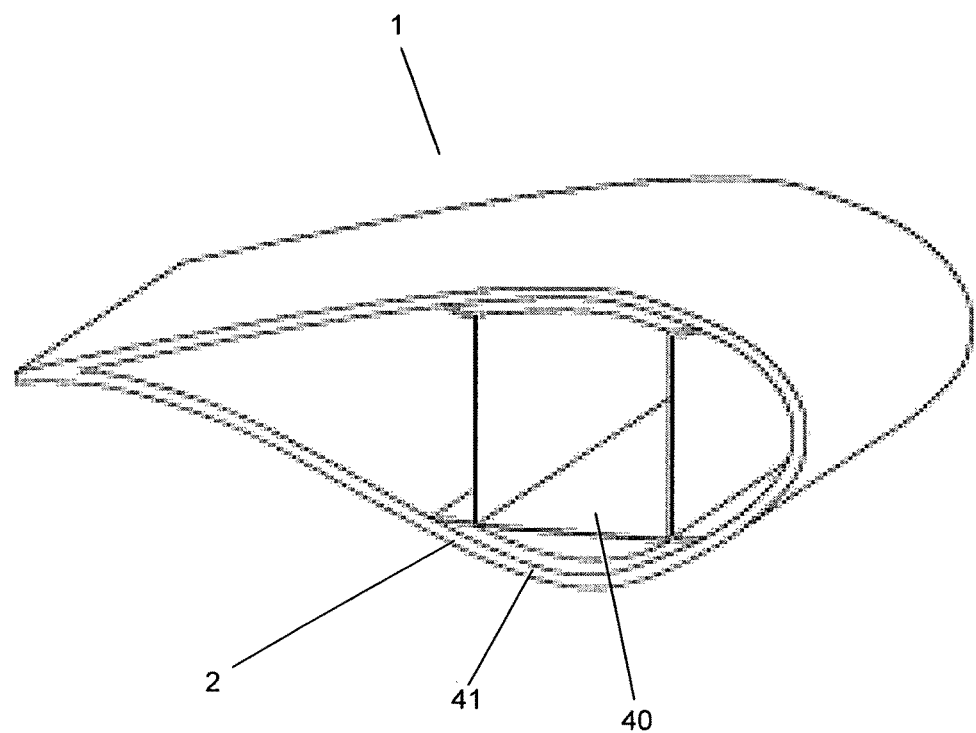
FIG. 10 is a perspective view of the separate cap part of FIG. 9 assembled with facing and shoring means of the aerodynamic profile.

FIG. 10 is a perspective view of a profile 1 assembled with a separate cap part 40 corresponding to the cap part 40 of FIG. 9. As it may be understood from FIGS. 9 and 10 the entire separate cap part 40 (or a minor part thereof) can be renewed or replaced in case of failure of the existing cap part. The existing cap part may be removed by a suitable cutting procedure and a new separate cap part 40 may then be bonded or otherwise connected to the existing profile 1. The outer surface 41 of the cap part itself may then form the surface of the profile in that particular region (not shown) or an entire, or at least a part of such, new facing 2 may be provided in order to cover the region having received a replaced cap part.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

As a part of a research project, the inventor has measured the effect of the invention on a full-scale test-object. The test are documented in the report "Full-scale Test of a SSP34m box girder 2—Data Report" Find M. Jensen, Kim Branner, Per H. Nielsen, Peter Berring, Troels S. Antvorskov, Joan H. Reffs, Peter H. Jensen, Malcolm McGugan, Risø-R-1622 (EN) (in progress) and in the PhD-Thesis "Ultimate strength of a large wind turbine blade" Find M. Jensen, Rise National Laboratory-Technical University of Denmark (in progress).

Figure 11:
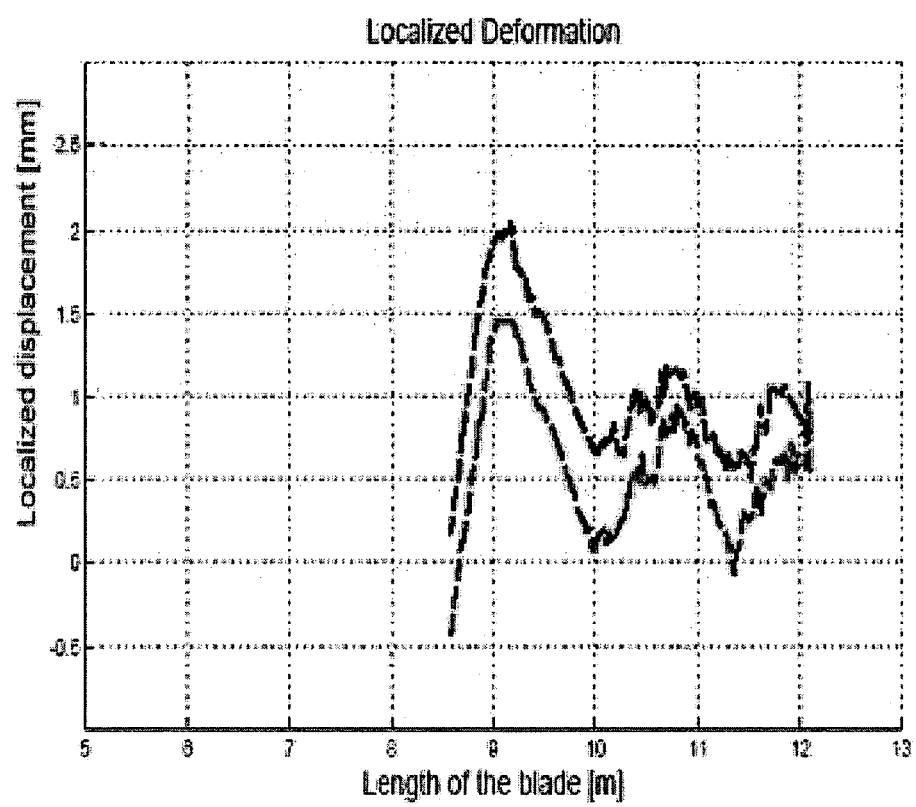
FIG. 11 shows a plot of test results from a comparison between the strength of an aerodynamic profile according to the present invention and a prior art aerodynamic profile.

A load carrying box girder (spar) of a 34 m wind turbine blade designed for use on a 1.5 MW wind turbine was tested. The box girder was loaded in the flapwise direction with loads that were close to the ultimate loads of the blade. The box girder was equipped with 3 different and independent measuring systems—strain gauges, position transducers and optical stereoscopic cameras—and the test was performed in a well established test facility for wind turbine blades. The test was initially performed with the box girder in its original design. After the initial test, the test-object was the modified by addition of reinforcing elements in accordance with the present invention in the form of wires fastened to each side of the cap. After the modification of the box girder, the test was repeated using the same loads and measuring systems. The results from the tests were compared and the result is shown in FIG. 11. The graphs show the deformation of the centre of the cap, and are plotted as a function of the length of the blade.

The test demonstrates that, depending on the distance from the end of the blade, the deformation of the cap is reduced 30-40% in the aerodynamic profile according to the present invention as compared to the prior art aerodynamic profile. By reducing the deformation of the cap at this level, the box girders resistance to buckling is increased significantly and this will in turn increase the ultimate strength of a complete wind turbine blade with the aerodynamic profile according to the present invention.

The reduction of the deformation of the cap will also prevent formation of interlaminar cracks in the material of the cap to a great extend, and this will increase both the reliability and the ultimate strength of the blade.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims

The invention claimed is:

1. An aerodynamic profile, comprising
a shell having an outer surface with a substantially transverse curvature, and
at least one straight reinforcing element for increasing the strength of the shell against flapwise forces, each straight reinforcing element being connected to an inner surface of the shell with at least two connections having a mutual distance in the edgewise direction and extending substantially in the edgewise direction, the shell having a substantially transverse curvature between the at least two connections,
whereby the at least one straight reinforcing element increases the strength of the shell by inhibiting an increase of the mutual distance in the edgewise direction between the at least two connections.

2. The aerodynamic profile according to claim 1, further comprising shoring means in a longitudinal direction along at least a part of the aerodynamic profile.

3. The aerodynamic profile according to claim 2, wherein said shoring means is/are embedded in or form part of said shell.

4. The aerodynamic profile according to claim 2, wherein said shoring means comprise at least one internal girder connected to at least a part of the inner surface of said shell.

5. The aerodynamic profile according to claim 4, wherein said at least one internal girder comprises a box girder or a box beam.

6. The aerodynamic profile according to claim 3, wherein said at least one reinforcing element is connected to said shoring means with at least two connections.

7. The aerodynamic profile according to claim 6, wherein at least one of said connections is continuous along at least one or more parts of said shell and/or said shoring means.

8. The aerodynamic profile according to claim 1, wherein the at least one reinforcing element is a bar or rod-like element.

9. The aerodynamic profile according to claim 1, wherein the at least one reinforcing element is a plate.

10. The aerodynamic profile according to claim 1, wherein the at least one reinforcing element is a laminate.

11. The aerodynamic profile according to claim 10, wherein said laminate comprises one or more cut-outs.

12. The aerodynamic profile according to claim 2, wherein said reinforcing element and said shoring means are fixedly interconnected.

13. The aerodynamic profile according to claim 2, wherein said reinforcing element and said shoring means are releasably interconnected.

14. The aerodynamic profile according to claim 1, wherein a space defined between one of said reinforcing element and the inner surface of the shell is at least partly filled with a filler material.

15. The aerodynamic profile according to claim 14, wherein said filler material is provided as an element of a foamed material.

16. The aerodynamic profile according to claim 2, wherein the at least one reinforcing element and a part of the surface of the shell are comprised in a separate cap part connected to the inner surface of the profile and/or to said shoring means.

17. A wind turbine with two or more blades wherein the blades comprise an aerodynamic profile according to claim 1.

18. A load-bearing construction comprising one or more aerodynamic profiles according to claim 1.

19. A method for manufacturing a reinforced aerodynamic profile comprising:
providing at least a part of a shell of the profile;
providing shoring means in connection with said shell; and
connecting each of at least one straight reinforcing element to an inner surface of the shell with at least two connections having a mutual distance in the edgewise direction in such a way that each of the at least one straight reinforcing element extends substantially in the edgewise direction, the shell having a substantially transverse curvature between the at least two connections, thereby increasing the strength of the shell by inhibiting an increase of the mutual distance in the edgewise direction between the at least two connections.

20. The aerodynamic profile according to claim 1, wherein each of the at least one reinforcing element has a thickness that is less than twice the maximum thickness of the shell.

21. The aerodynamic profile according to claim 1, wherein the at least one reinforcing element is connected at a cap part of the shell.

22. The aerodynamic profile according to claim 1, wherein said at least one reinforcing element is connected to the inner surface of the shell with at least two connections.

23. The aerodynamic profile according to claim 2, wherein the at least one reinforcing element is connected to the shoring means.

24. The method according to claim 19, further comprising providing a filler material in a space between the at least one reinforcing element and the inner surface of the shell.

25. The method according to claim 24, wherein providing a filler material includes adapting an element of a foamed material to fit in the space.

26. The method according to claim 25, wherein the foamed material supports the at least one straight reinforcing element.

27. The method according to claim 19, further comprising:
manufacturing a separate cap part,
aligning the separate cap part with the shell, and
connecting the separate cap part to the shell.

28. The method according to claim 27, further comprising including the at least one reinforcing element in the separate cap part.

29. The method according to claim 19, further comprising pre-stressing the at least one reinforcing element.

\* \* \* \* \*